United States Patent Office 2,935,743
Patented May 3, 1960

2,935,743

NOISE REDUCTION IN CONTINUOUS WAVE DOPPLER RADAR SYSTEMS

Keith Cecil Malcolm Glegg, Pointe Claire, Quebec, Canada, assignor to Canadian Marconi Company, Montreal, Quebec, Canada Application June 4, 1956, Serial No. 589,165

16 Claims. (Cl. 343—8)

This invention is concerned with continuous wave radar systems adapted to utilize the Doppler frequency shift effect present in echoes returned from a moving target, and is particularly directed to the reduction of the effects of noise in such systems.

In the present specification the term "continuous wave system" has the usual significance as applied to radar systems, namely that echoes are received and examined concurrently with the transmission of energy, although there may be periodic or cyclic interruptions of such transmissions.

In continuous wave radar systems the problem exists of minimizing the effects upon the receiver of energy leaking thereto directly from the transmitter. In the usual so-called Doppler systems this problem is particularly acute because the leak signals and the echo signals are normally of very nearly the same frequency, so that if the leak signals are modulated by noise the noise sidebands are very likely to obscure or even obliterate the Doppler shifted echoes. To enable echo signals to be distinguished in the presence of noise it is desirable that the strength of the echo signals should be at least of the same order of magnitude as that of the noise signals. By "the same order of magnitude" is meant that the two quantities differ by a factor of less than 10. In airborne radars the problem becomes particularly acute because the vibration to which the system is almost invariably subjected produces microphonic effects which are very difficult to overcome.

In my co-pending United States application Serial No. 589,164, filed June 4, 1956, I have set forth a system wherein the effects of microphonics upon the performance of continuous wave radars have been very greatly reduced. However, when by use of the abovementioned invention the effects of microphonics have been successfully overcome, it is then found that the electronic noise produced by the transmitter tube sets a limit to the sensitivity which may be achieved. The present invention, therefore, is concerned with finding a simultaneous solution to the problem of both microphonic and electronic noise effects in Doppler radars.

To illustrate the electronic noise aspect of the problem let it be required in a Doppler radar to detect echo signals at a level of 145 decibels below the transmitted power. Assume that the Doppler shift range of interest includes, say, a band extending from 1 kilocycle to 2 kilocycles, and that the transmitter tube is a reflex klystron of the type usually employed as the local oscillator in microwave receivers, and operating at 10,000 megacycles. The envelope of the electronic noise power spectrum of the klystron transmitter tube is a function of the Q of the resonant cavity, and will result in a noise power, at the signal frequency, of approximately minus 60 decibels with reference to the transmitter in our selected 1 kilocycle wide band. Now, even if we were to assume that no microphonic noise at all is present, it would still be necessary to provide 85 decibels of isolation between the transmitter and the receiver if the transmitter noise picked up by the receiver is to be no greater than the echo signals. Known duplexer-single antenna arrangements are hopelessly inadequate for this purpose. To even approach the required decoupling present techniques require not only such precautions as careful internal shielding but, in addition, the use of separate transmitting and receiving antennas spaced an appreciable distance apart. In airborne equipment, where weight and bulk are of primary importance, it has hitherto been impractical to achieve the above degree of isolation between the transmitter and receiver systems. We therefore find that even when the problem of microphonic noise in airborne Doppler radars is overcome, we are still confronted with electronic transmitter noise as a barrier to achieving extremely high effective system sensitivity.

It is an aim of the present invention to provide simplified means to obtain high effective sensitivity, or signal to noise ratio, in a continuous wave Doppler radar system.

Another aim of the invention is to enable a continuous wave Doppler radar to operate efficiently using only one antenna system for both transmitting and receiving purposes.

A further aim of the invention is to provide a high performance continuous wave Doppler radar system which does not require the elaborate automatic frequency control systems which hitherto have had to be employed.

According to the invention there is provided a continuous wave Doppler radar system having a transmitter and a receiver section and comprising, a tunable transmitter oscillator in the transmitter channel operating at a given carrier frequency and having an electronic noise spectrum distribution contained within a given static envelope contour whose amplitude decreases as a function of the distance from said carrier frequency, modulator means adapted to so frequency modulate said oscillator that a frequency modulation sideband component of a given order falls upon a predetermined point on the skirt of said static envelope contour, a signal mixer in the receiver channel, an antenna system adapted to radiate energy to a relatively moving target and to receive Doppler shifted echo signals from said moving target, duplexer means coupling said transmitter and receiver channels to said antenna system, means to apply without significant phase delay to said mixer a portion of the energy from said oscillator, frequency selective signal wave translating means fed from said mixer and responsive to signals having frequencies close to the difference in frequency between said carrier frequency and the frequency of said frequency modulation sideband component of a given order, Doppler frequency signal demodulator means fed from said signal wave translating means, and utilization means responsive to the output of demodulator means.

The invention will be further described with reference to the accompanying drawings in which.

The embodiments are set forth for the purpose of illustration only, and in no wise should the invention be construed as being limited thereto. The system of Figure 1 will be discussed as being in a form which is suitable for use as an airborne groundspeed Doppler radar indicator, and the various operating parameters, such as frequency, will be either specifically assigned or implicitly assumed on the basis. It will, however, become apparent to those skilled in the art that the invention is in no way limited to such a choice of operating conditions.

Figure 1:
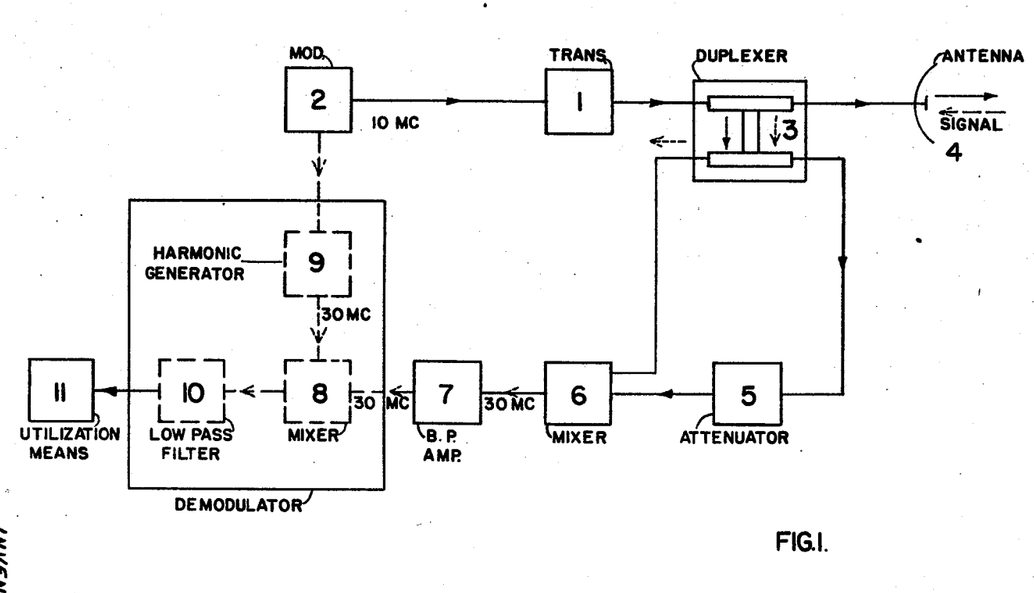
Figure 1 shows in block diagram form one embodiment of the invention particularly adapted for airborne use.

In Figure 1, 1 represents the transmitter oscillator which will be assumed to be a reflex klystron oscillator. Essentially the only restriction on the type of oscillator used is that it have an electronic noise spectrum distribution envelope contour whose amplitude decreases as a function of the distance from the nominal carrier frequency. Thus oscillators using tuned cavities, such as klystrons, are suitable at microwave frequencies. The nominal carrier frequency will be taken to be 10,000 megacycles. A modulator 2, operating at 10 megacycles (for the purpose of illustration) frequency modulates the transmitter with a modulation index selected in accordance with the principles to be elucidated later. Signals from the transmitter are both radiated and applied, after attenuation if necessary, to a mixer, 6, where, as will be seen later, they serve the same purpose as the local oscillator signals of the usual superheterodyne receiver. Target echo signals are fed to the signal input terminals of mixer 6. While the above mentioned processes, as will be evident to those skilled in the art, may be accomplished by a variety of well known circuit arrangements, I prefer in the present embodiment the extremely simple and straightforward system shown in the drawing. A duplexer, 3, is fed with both transmitter signals and echo signals. The transmitter signals are delivered by the duplexer to the antenna 4, and to mixer 6. As shown, the transmitter energy reaches mixer 6 via the attenuator 5. It will be appreciated that this energy could be furnished to the mixer from a directional coupler located at the output of the oscillator 1 if it is so desired. The latter method may be preferred when certain types of duplexers (such as "circulators") are employed. Echo signals travel from the antenna 4 through the duplexer to the mixer 6. The duplexer may be of any one of several types. For instance, a magic T or a retrace is suitable, or a so-called "circulator" employing the ferromagnetic Faraday effect for the separation of signals may be employed.

As will be demonstrated later, the output of the mixer 6 contains a series of pairs of echo sideband signals, each pair straddling a different harmonic of the modulation frequency and separated therefrom by the Doppler frequency shift. In the present embodiment, of the various signal products produced in mixer 6 by heterodyne action, those in the region of 30 megacycles are selected by the band pass amplifier 7 and delivered to a demodulator. It will be realized that we are here concerned with signals having the nature of those in a double sideband suppressed carrier system. Hence to recover the intelligence borne by such signals we may employ any of the methods appropriate to said double sideband suppressed carrier systems which, of course, are well known to those skilled in the art. Though not limited thereto, one preferred demodulation arrangement is that indicated by the dashed line components within the block labelled "demodulator." With said arrangement the pair of echo sideband signals selected by the bandpass amplifier are fed to a second mixer, 8, where they are mixed with undelayed 30 megacycle signals derived from the modulation source 2. A harmonic generator, 9, responsive to signals from modulator 2 is used here as the source of 30 megacycle signals for mixer 8. In some cases where this type of demodulation is used, as will be shown later, it is possible to dispense with the generator 9 since under certain conditions the output from the oscillator, reaching mixer 8 via amplifier 7 after modification in the first mixer 6, will contain a 30 megacycle component of suitable amplitude to ensure the production of the required demodulation products. The output of mixer 8 is fed to a filter, 10, responsive to signals of the Doppler shift frequency. This filter then delivers the Doppler signals to utilization means, 11, appropriate to service in which the radar system is employed.

Figure 2:
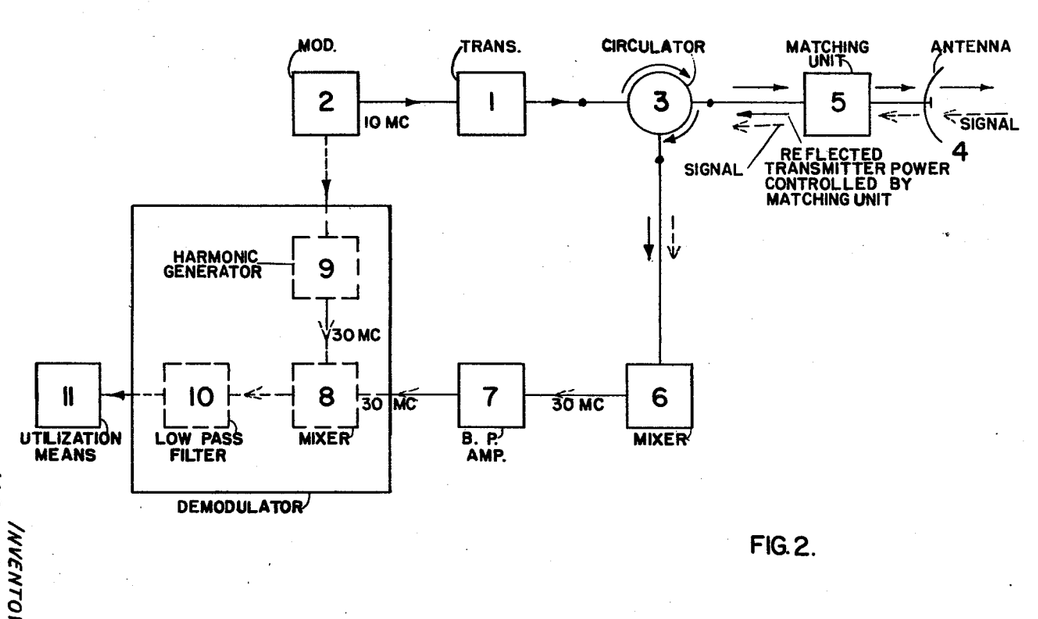
Figure 2 shows a modification of the embodiment of Figure 1.

Referring now to Figure 2 there is shown a modification of the embodiment of Figure 1 which, at a cost of a small loss of sensitivity, permits of the use of a much simplified radio frequency head end system. In Figure 2 corresponding or analogous system elements relative to the system of Figure 1 are identified by the same numbers.

In the system of Figure 2 the duplexer element 3, as shown by the conventional symbol, is a circulator. Energy from the transmitter 1 is applied to the left hand terminal of the circulator, passes through it to the right hand terminal and on out to the antenna. Energy such as echo signals incident from the right on the right hand terminal of the circulator is passed to the lower terminal and on to the mixer 6. In this system the mixer 6 is a single ended input mixer. (While in the system of Figure 1 such a mixer could also be used, a dual input mixer, by reason of its higher conversion gain, would normally be used and this is implied in the drawing of Figure 1.)

To provide the required undelayed energy from the oscillator to the mixer the matching unit 5 is employed. This matching unit simply reflects a small part of the oscillator energy incident upon it back to the circulator, and in practice may consist simply of a screw threaded through a wall of the waveguide between the circulator and antenna. By adjustment of the extent of protrusion of this screw into the interior of the guide the amount of oscillator energy delivered to the mixer may readily be varied.

While it is evident that the identical principle of operation is to be found in the embodiments of both Figure 1 and Figure 2, those familiar with the design of microwave "plumbing" will recognize that the arrangement of Figure 2 permits of great simplification in component design. It is likely, therefore, that the system of Figure 2 is to be preferred to that of Figure 1 in many cases despite its slightly lower sensitivtiy.

It will be noted that the two foregoing embodiments of the invention eliminate one of the antennas and the elaborate automatic frequency control arrangements which have hitherto been found essential to achieve high performance in airborne Doppler radars. It has been found in practice that, despite the radical simplification of the system, operational signal to noise ratios considered in the past by those skilled in this particular field to be possible only in theory are capable of attainment without difficulty.

The foregoing embodiments of the invention have been considered on the basis of their adaptation to light weight airborne use such as for groundspeed indicators. In services such as this the transmitter power required is relatively low, extending possibly to a limit of a few watts. There is another class of Doppler radar systems wherein use is made of the now available continuous wave oscillator tubes providing power at the kilowatt level. Such systems are desirable for the detection of small and distant targets rather than the large and relatively near target constituted by the earth in case of the previously discussed systems.

Figure 3:
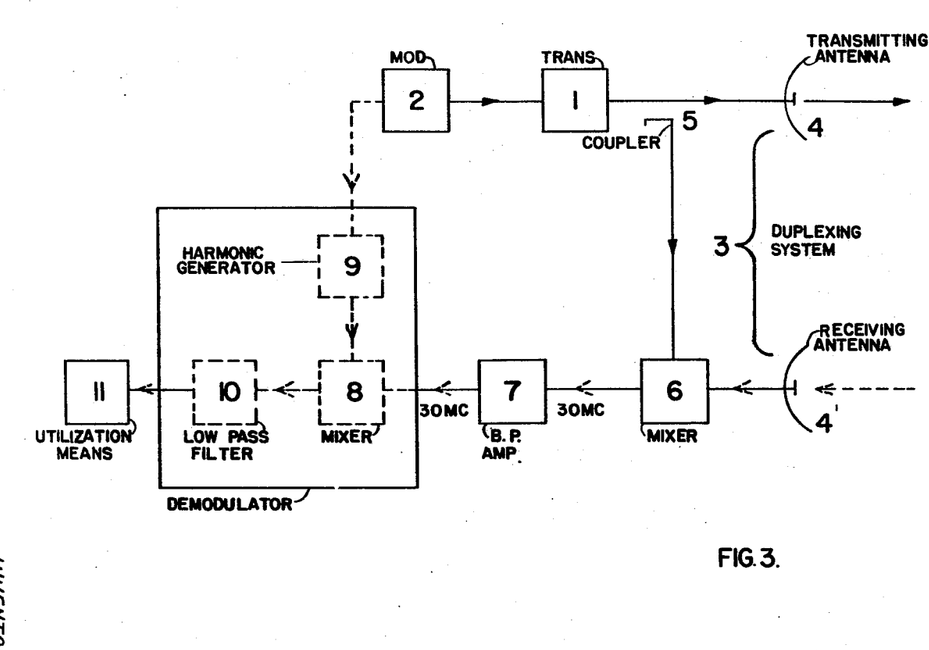
Figure 3 shows an embodiment of the invention adapted for use with small and distant targets.

When using power levels of the order of hundreds of watts the types of duplexers previously suggested are, in general, incapable of providing sufficient isolation to prevent the usual crystal mixer from being burned out by the leakage power from the transmitter. To apply the present invention to such systems we may revert to the use of space duplexing rather than using the hybrid or circulator duplexers set forth in the embodiments of Figures 1 and 2. Such a system is shown in Figure 3 wherein corresponding or analogous components are designated by the same numbers as in Figures 1 and 2. In this arrangement of the invention two well spaced antennas are employed as in the usual Doppler systems, one for transmitting, the other for receiving. Such a system provides a practical method of obtaining a very high degree of isolation between transmitted and received signals in fixed ground stations where space requirements are a minor consideration. Transmitter energy is radiated by antenna 4 and received echoes are picked up by the receiver antenna 4¹ and mixed in mixer 6 with signals derived from the transmitter by a coupler 5 which extracts a small amount of the transmitter energy travelling to the transmitter antenna 4. The system otherwise operates in the same manner as previously described.

Whereas in past ground station Doppler radars it has been possible to obtain relatively high performance as compared to airborne systems, the use of the present invention for such service now provides a very appreciable increase even in this performance, while at the same time radically reducing the complexity and cost of the previous systems.

Figure 4:
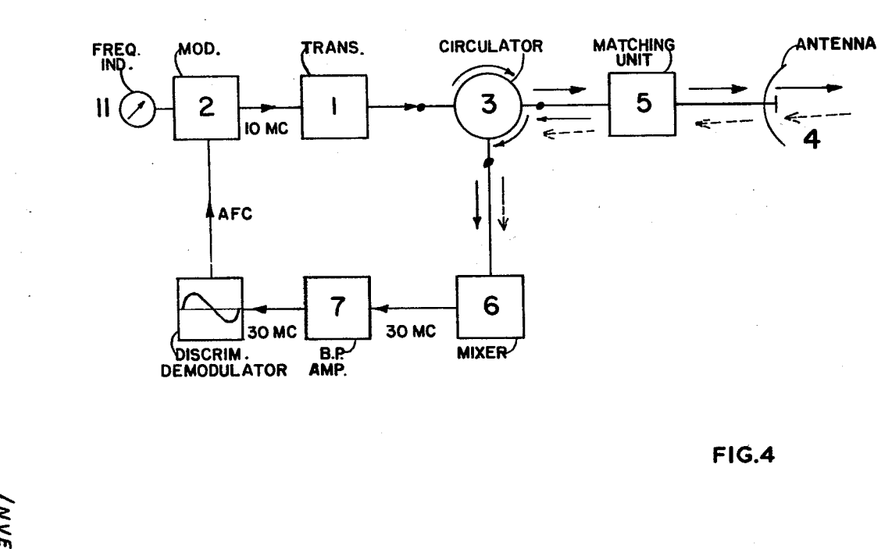
Figure 4 shows an embodiment using a different demodulation system from that shown in Figures 1, 2, and 3.

In the foregoing embodiments the system used for recovering information from the suppressed carrier double side band type of signals has been illustrated as employing a second heterodyne mixer. Whereas other demodulators such as simple rectifier envelope detectors could be used, the invention also lends itself particularly well to a method of operation analogous to automatic tracking using a servo loop. Apparatus for this type of operation is illustrated in Figure 4 of the drawings which shows insofar as is necessary to the understanding thereof the principles used.

Doppler radar target echo signals will not, in general, be confined to a single frequency but will be spread out in a small spectrum around a nominal center frequency. In view of this it may be somewhat difficult to determine the center frequency precisely. In the system of Figure 4 the signal from the bandpass amplifier 7 is fed to a discriminator of the automatic frequency control type which produces a control signal having a magnitude and polarity dependent upon the deviation of the applied signal from a predetermined center frequency. The predetermined center frequency of the discriminator is chosen to be in the mid operating range of one of the signal sidebands, one only of the sidebands being used.

The output from the discriminator is applied as automatic frequency control to the modulator, 2, using any one of the appropriate methods well known in the art to maintain the sideband signal centered on the zero reference datum of the discriminator. The modulation frequency will therefore be constrained to be a function of the Doppler shift frequency. By means of a suitably calibrated frequency meter, 11, indication of the target speed may be provided, or if desired some other utilization means responsive to the frequency of the modulation may be employed.

Figure 5:
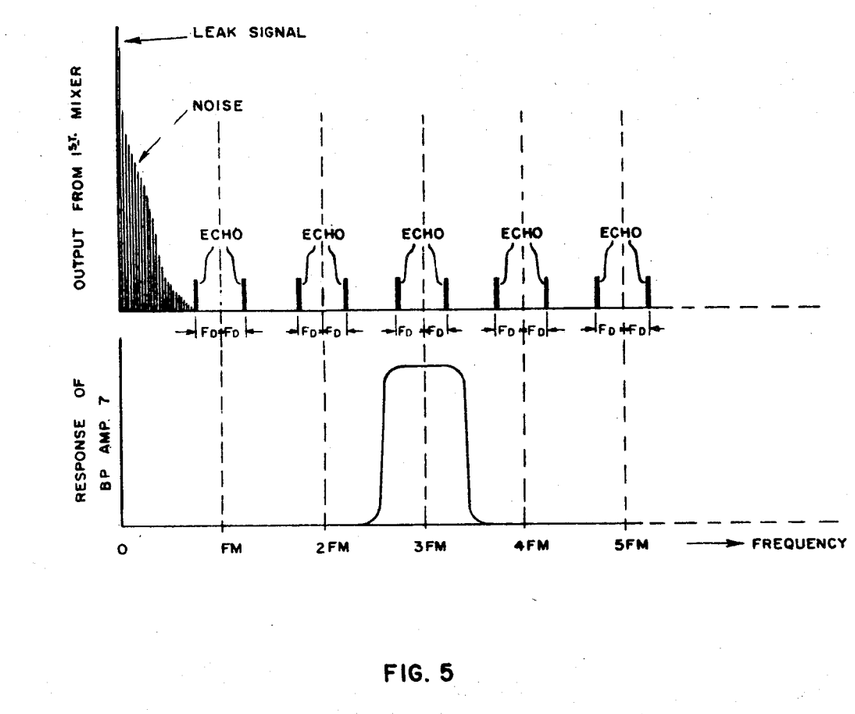
Figure 5 shows the spectrum distribution of the signals present at the output of the signal mixer in one representative embodiment of the invention.

Before analyzing the operation of the system and establishing the basis for the selection of operating parameters, some of the elementary principles upon which the arrangement is based may be briefly stated. Reference may be made here to Figure 5 of the drawings which shows in a general way the spectrum distribution in the embodiments discussed, of the signals present at the output of mixer 6, and wherein $F_M$ represents the modulation frequency, and $F_0$ represents the doppler frequency shift of the plurality of elements of a target echo signal. In the mixer 6 those signals which have not been delayed (by transmission to and from a target) may be considered to be converted to essentially zero frequency. Microphonic amplitude modulation sideband components are present, but these extend from zero only to a relatively low frequency. The delayed signals, on the other hand, are spread out into pairs of side bands, which, in the embodiment described, are spaced 10 megacycles apart. Of these sideband pairs, in the present instance the third, centered at 30 megacycles, is selected by the bandpass amplifier and passed to a demodulator arrangement adapted for double sideband suppressed carrier operation. The carrier re-insertion method of demodulation is readily performed in the invention since the source of the carrier is at hand. The demodulated signal, of the Doppler shift frequency, is then employed as desired.

From the above generalized description of the operation of the invention some indication of the principles involved may be obtained, but a more detailed analysis provides the basis for establishing further very important concepts concerning the proper relation of operating parameters.

The wave of oscillator energy incident on the mixer, 6 (via the attenuator 5 in Figure 1), can be represented by the following expression:

$$[f(t)][\cos\{W_c t + p \cos W_m t + N(t)\}] \qquad (1)$$

where the symbols are to be interpreted as follows:

$f(t)$ represents some amplitude modulating wave which is impressed on the transmitter as an incidental (vibration, shot noise, etc.) effect, $N(t)$ represents some angular modulating wave which is impressed on the transmitter in the same way as $f(t)$, $W_c$ is the angular carrier frequency ($2\pi F_c$ where $F_c$ is 10,000 megacycles in the present case), $W_m$ is the angular modulation frequency at which the frequency modulation is carried on, P is the frequency modulation index, and is given by the ratio $\Delta F/F_m$ where $\Delta F$ is the peak frequency deviation and $F_m$ is the frequency corresponding to $W_m$.

Since (1) is taken to be the wave incident on the mixer (local oscillator) terminals, $t$ represents the time as measured at the mixer (local oscillator) terminals. Now, taking the mixer local oscillator terminals as reference, the wave incident on the signal terminals of the mixer 6 can be resolved into two distinct parts, namely:

(a) Those components of the wave which are due to internal reflections in the system in connection with which the delay will be essentially small. These are undesirable in general, and will be of the order of twenty to forty decibels below the level of the transmitted power. It is these components which act as carriers for all the incidental and unavoidable disturbances in the system, which disturbances mask the signal in the pure continuous wave case.

(b) Those components of the wave which are due to genuine signals returned from the target which carry the required Doppler shift, and in connection with which the delay will be essentially large.

The wave incident on the signal terminal of the mixer 6 can therefore be represented by the following expression:

$$[g(t)][\cos\{W_c(t+t_1) + p \cos W_m(t+t_1) + h(t) + N(t+t_1)\}]$$
$$+ [L(t)][\cos\{W_c(t+T) + W_d t + p \cos W_m(t+T) + N(t+T)\}] \qquad (2)$$

In (2) above, the first line corresponds to the (a) part of the wave mentioned previously, and the second line to the (b) part.

The symbols are to be interpreted as follows:

$g(t)$ is some new amplitude modulation which the wave carries (f(t) modified by reflections).

$t_1$ is the delay suffered inside the system, $h(t)$ is some additional angular modulation which the wave suffers due to variable reflections, T is the delay associated with travel to the target and back to the mixer, $W_d$ is the angular Doppler frequency.

$L(t)$ measures the loss from the transmitter to the target and back to the mixer.

In the mixer, the waves represented by (1) and (2) are mixed and the difference components of frequency are preserved at the output. The significant mixer output can therefore be obtained by multiplying (1) by (2) and collecting the difference frequency terms.

This yields for the mixer output wave:

$$\tfrac{1}{2}[f(t)][g(t)][\cos\{W_c t_1 + p \cos W_m(t+t_1) \\ -p \cos W_m t + h(t) + N(t+t_1) - N(t)\}] \\ + \tfrac{1}{2}[t(t)][L(t)][\cos\{W_c T + W_d t + p \cos \\ (W_m t + T) - p \cos W_m t + N(t+T) N(t)\}] \quad (3)$$

Expression 3 can be rearranged to give:

$$\tfrac{1}{2}[f(t)][g(t)] = \left[\cos\left\{h(t) \right.\right.\\ \left. -2p \sin\left(\frac{W_m t_1}{2}\right) \sin\left(W_m t + \frac{W_m t_1}{2}\right) \right.\\ \left. + W_c t_1 + N(t+t_1) - N(t) \right\}\right] + \tfrac{1}{2}[f(t)][L(t)]\left[\cos\left\{W_d t \right.\right.\\ \left. -2p \sin\left(\frac{W_m T}{2}\right) \sin(W_m t + W_m T) \right.\\ \left. + W_c T + N(t+T) - N(t)\right\}\right] \quad (4)$$

If the analysis is continued rigorously from here to the point of determining the demodulation products at the output of the demodulator, it will be found that certain components of (4) either cancel or have values that make them of no significance. Instead of carrying out the calculations here it will be sufficient to interpret the results so obtained in terms of the physical features of the system as follows:

(i) $\quad \frac{W_m t_1}{2}$ is negligible compared to $\frac{\pi}{2}$

This amounts to saying that the delay encountered within the system is so short compared with the period of a modulation cycle as to be negligible. In relation to the wave $N(t)$, this assumption also means that, if we consider only those parts of the spectrum of $N(t)$ extend from zero to say 3 or 4 times $W_m$, we can write $N(t+t_1) - N(t) = 0$.

(ii) Fixed phase shifts such as $W_m t_1$, $W_m T$, $W_c t_1$ and $W_c T$ are of no real practical interest, and can conveniently be taken as zero.

We can then write the essentials of the mixer output as:

$$\tfrac{1}{2}[f(t)][g(t)][\cos\{h(t)\}] \\ + \tfrac{1}{2}[f(t)][L(t)]\left[\cos\left\{W_d t - 2p \sin \frac{W_m T}{2} \sin W_m t \right.\right.\\ \left. + N(t+T) - N(t) \right\}\right] \quad (5)$$

The second line of (5) represents the genuine echo signal output from the mixer. Examination of the contents of the term in the right hand square bracket shows that the signal consists of the Doppler frequency $W_d$ frequency modulated sinusoidally at the rate $W_m$ and with an index of modulation given by:

$$2p \sin \frac{W_m T}{2} \quad (6)$$

(The effect of $N(t+T) - N(t)$ is found on rigorous analysis to be negligible, leading only to some small spread in the value of $W_d$.)

The observation leading to (6) is very significant, for it indicates that the signal can be found at the frequencies (sidebands on $W_d$) given by:

$$W_d + nW_m \quad (7)$$

$n = 0, \pm 1, \pm 2$ etc. and further, that the amplitudes are:

$$\tfrac{1}{2}[f(t)][L(t)]\left[J_n\left(2p \sin \frac{W_m T}{2}\right)\right] \quad (8)$$

where $J_n$ is the Bessel function of order $n$, for which $J_{-n} = (-1)^n J_n$. Expressions 7 and 8 follow directly from the usual expansion of a frequency modulated wave into sidebands, after neglecting $N(t+T) - N(t)$.

The effect in (5) and (8) of $f(t)$ amplitude modulating the return signal is, like $N(t+T) - N(t)$, negligible, and represents merely a slight fluctuation in the loss $L(t)$.

We will now consider the first line of (5) which represents the output from the mixer resulting from miscellaneous effects inside the system. From the definition of $h(t)$ it will be seen that $h(t)$ contains only mechanical frequencies, of say 50 kilocycles maximum in a practical case. Also, since the actual mechanical excursion of the vibrating parts in the system will be small compared to the wavelength at 10,000 megacycles, the effective modulation index associated with $h(t)$ will be small. We can therefore safely assume that $\cos\{h(t)\}$ will contain no frequencies higher than about 500 kilocycles.

From the definitions of $f(t)$ and $g(t)$ it is clear that they can each carry both mechanical and electronic components of noise. The mechanical frequency components do not extend beyond 50 kilocycles, but the electronic components are those associated with electronic noise in the transmitter, and so extend out to many megacycles with significant amplitude. It is therefore quite evident that beyond 500 kilocycles the spectrum of the first part of (5) is essentially the amplitude modulation electronic noise spectrum that was previously centered on the carrier $W_c$, but, according to (5), now centered essentially at zero frequency.

The foregoing discussion of the two parts of (5) now allows one to draw the very important conclusion that if we choose $F_m$, the modulating frequency, at say 10 megacycles, then the signal can be obtained from the mixer at frequencies centered at 10, 20, 30 etc., megacycles. At these frequencies the only components of noise due to local disturbances in the system will be those originally to be found only as amplitude modulated electronic noise the same number of megacycles away from the original transmitter frequency $W_c$.

As will be noticed from the first line of (5) it is only the amplitude modulation components of electronic noise that are left in the mixer output, the frequency modulation components in the form of $N(t)$ having completely disappeared from the output, due mainly to the assumption (i) made just prior to (5).

It should be noticed that the modulation index given in (6) is periodic in T and vanishes for values of T such that:

$$T_r = r \cdot \frac{1}{F_m} \quad (9)$$

$r = 0, 1, 2$ etc.

The various $T_r$ therefore correspond to distances at which the signal vanishes. As will be seen from (9) the signal vanishes when the delay is an integral multiple of the modulation period. In actual fact, of course, no vanishing of the signal can be noticed in a system such as a Doppler radar groundspeed indicator for aircraft where the transmitted beam illuminates the earth, since the angular spread of the beam leads to a time spread that far exceeds $$\frac{1}{F_m}$$

when $F_m$ is of the order of 10 megacycles. (Of course, if the beam were illuminating a small target, the relays $T_r$ would be associated with zero (small) return signals.) In a groundspeed indicator system, therefore, for all practical beam widths there will be no "dead height" resulting from modulating the transmitter. There is simply a flat power loss which results from averaging the return over all delays from zero up to one period of modulation. That is, the return power is obtained by multiplying the unmodulated C.W. return power by:

$$\frac{1}{2\pi} \cdot W_m \cdot \int_0^{\frac{2\pi}{W_m}} J^2 n\left(2p \sin \frac{W_m T}{2}\right) dT \quad (10)$$

for each sideband corresponding to $n$. The Expression 10 neglects the effect of the increase in loss which must evidently occur due to increase in delay, but this leads to only a very slight error when the modulating frequency is as high as 5 megacycles and the distance to the ground exceeds two or three hundred feet.

So far, the analysis has shown that the output of the mixer 6 contains the signal at various frequencies which are separable from the local disturbances. The problem then still remains of showing how a choice is made among the many possible values of $n$ at which the signal might be extracted. It should be pointed out that the choice is not so much one of absolute frequency, but really a choice of $n$. Due to the nature of the usual intermediate frequency amplifier, it is desirable for best noise figure to keep the frequency at which the signal is removed from the mixer in the range of 10 to 45 megacycles.

It is to be noted that $W_m$ will generally be some thousand times greater than $W_d$. This means that instead of speaking of sidebands given by:

$$W_d + nW_m$$

$n = 0, \pm 1$, etc., it would be more straightforward physically to imagine the frequencies:

$$nW_m \pm W_d \quad (11)$$

$n = 0, 1, 2$ etc.

What (11) shows is that the mixer delivers the upper and lower sidebands really as adjacent signals. This is of course very convenient, for it makes it possible to recover 3 decibels in signal to noise ratio in a system by using two sidebands. In such a detection process the sidebands add (or cancel to zero) in amplitude whereas it is the noise powers which add, with a resulting gain of 3 db in signal to noise ratio. However, if it is desired to distinguish between the upper and lower Doppler shifted sidebands, the system of the present invention is obviously well suited for such operation by the provision of an appropriately tuned bandpass filter after the first mixer.

In order to see what factors determine the value of $n$ to use we begin by noticing that the integral in (10) gets smaller as $n$ increases. For this reason it would at first appear that the smallest usable value of $n$, namely $n=1$, should be used. However, other considerations make it desirable to work at $n=2, 3$, and possibly even $n=4$ or 5, notwithstanding the reduction in the integral (10).

To see what these considerations are, we go back to Expression 4 for the mixer output. It will be recalled that in going from this expression to (5) it was assumed that $t_1$ was, in effect, zero. We must now examine more carefully the effect of $$\frac{W_m t_1}{2}$$

being small, rather than equal to zero. In an aircraft groundspeed indicator system this would be the equivalent of considering the effect of returns from such close-in vibrating targets as those constituted by the radome, fuselage of the craft, and so forth. To effectively illustrate such a case mathematically we consider a special case in which we put:

$$h(t) = W_h \cdot t \quad (12)$$

and still assume that $N(t+t_1) - N(t) = 0$. We also assume $W_c t_1 = 0$, but basically this assumption has nothing to do with assuming $t_1 = 0$, since $W_c t_1 = 2\pi$ would have the same effect.

Using the above, we can rewrite (4) and instead of (5) get for the mixer 6 output:

$$\tfrac{1}{2}[f(t)][g(t)]\left[\cos\left\{W_h t - 2p \sin\left(\frac{W_m T}{2}\right) \sin(W_m t)\right\}\right]$$
$$+\tfrac{1}{2}[f(t)][L(t)]\left[\cos\left\{W_d t - 2p \sin\left(\frac{W_m T}{2}\right) \sin W_m t \right.\right.$$
$$\left.\left. + N(t+T) - N(t)\right\}\right]$$
$$(13)$$

Now, the same argument which was applied to the second line of (5), can be applied to the first line of (13) as well. This will show that there are actually internal disturbance effects (characterized by $W_h$) at frequencies:

$$W_h + nW_m \quad (14)$$

$n = 0, \pm 1, \pm 2$ etc, and the amplitudes are proportional to:

$$Jn\left(2p \sin\left(\frac{W_m t_1}{2}\right)\right) \quad (15)$$

Now since $t_1$ is small we can write for (15):

$$Jn(pW_m t_1) \quad (16)$$

where $pW_m t_1$ is still very much less than unity. Since (16) represents the disturbance and, from (8):

$$Jn\left(2p \sin \frac{W_m T}{2}\right) \quad (17)$$

represents the signal, the object is always to make (16) much less than (17) (more accurately, the square root of the average in (10)).

Now since $pW_m t_1$ is small compared to unity we can put:

$$Jn(pW_m t_1) = \left(\frac{pW_m t_1}{2^n n!}\right)_n \quad (18)$$

It is evident from (18) that if $J_1(pW_m t_1) = 0.05$, say, then $J_3(pW_m t_1) = 0.00002$. That is, the magnitude of the voltage due to the internal disturbance can be reduced by a factor of 2500 by going from $n=1$ to $n=3$. For all values of $T$ that are of interest the value of the Expression 17 (or more accurately, the value of the square root of the average in (10)) will not change by more than a factor of about 3 in going from $J_1$ to $J_3$. This means that the signal to disturbance voltage ratio in the example quoted is improved by a factor of about one thousand by working at $n=3$ insead of $n=1$.

The foregoing example serves to demonstrate the fact that at the expense of a small loss in the strength of signals in the system very large improvements in signal to disturbance ratios can be obtained by going to higher values of $n$ than $n=1$. The compromise will evidently have to be struck on the basis of the actual problem, but it would seem that very likely the most generally useful values of $n$ would be between 2 and 5.

The next system parameter to be chosen is $p$, the modulation index. This is comparatively simple, for having specified $n$, it is noticed that (10) is a function of $p$ alone. The choice of $p$ is therefore made so as to maximize (10). This can best be done graphically by a trial and error process. However, as a rough guide it might be noticed that (10) approaches its maximum value when $2p$, the maximum value of the argument of $J_n$, just takes $J_n$ to its first maximum. This corresponds roughly to a value of $p$ given by: $2p = n+1$ i.e.

$$p = \tfrac{1}{2}(n+1) \quad (19)$$

The value of (10) is still near its maximum for values of $p$ considerably greater than that given in (19), with the result that the value of $p$ is not at all critical when it gets near the optimum value.

Having determined the preferred values of the parameters $n$ and $p$, we may now consider more closely the selection of the value for $F_m$, the modulation frequency. Primarily, the frequency modulation sideband to be used should be located well down on the skirt of the electronic noise spectrum contour envelope, and this is a function of the oscillator used. The sideband should also be well clear of any appreciable incidental frequency modulation components defined by the cos $(h(t))$ terms of (5). As previously mentioned, in a system such as that described such components would not extend beyond 500 kilocycles. And, as previously mentioned, the noise factor of the receiver must be considered. If, as is usual, the first mixer, 6, is a crystal diode, the low frequency noise characteristics of this crystal will normally dictate that operation below 10 megacycles be avoided. On the other hand, the noise factor of an amplifier deteriorates with increasing frequency, with the result that the preferred frequency of operation from the point of view of the receiver will usually fall within the range of 10 to 45 megacycles. A further consideration involves the characteristics of the transmitter oscillator. There obviously will be a limit beyond which any given oscillator may not be swung in frequency without requiring excessive modulation power and without producing excessive amplitude modulation. If a klystron oscillator is used amplitude modulation products may be an extremely important consideration since significant amplitude modulation sidebands at certain multiples of the modulating frequency, dependant in part upon the repeller voltage operating point chosen, will be produced with wide frequency swings. In view of this, in systems using a transmitter oscillator having modulation characteristics of the nature of those of klystrons, this factor, in addition to those previously evaluated for the selection of the parameter $n$, must be taken into account in deciding upon which frequency modulation sideband to use. In such systems, as above noted, not only is the extent of frequency swing of importance, but so too is the selection of the nominal operating point on the repeller voltage versus output amplitude characteristic curve of the klystron. When this operating point is on the peak of this curve, which point for reasons of optimum power output would normally be chosen, the amplitude modulation sidebands are predominantly located at even multiples of the modulation frequency. It follows from this, in the light of the previously discussed factors, that the value of 3 for the parameter $n$ is the one quite likely to be selected in actual practice.

It has been found that klystrons of the type most likely to be used in airborne service have a very definitely optimum repeller voltage operating region in respect to the production of amplitude modulation products. Therefore, although this region is relatively broad and operation therein is not critical, it is important that its location should be established in the initial design of the system. Excessive amplitude modulation, if permitted to occur, may so overload the system that proper operation cannot be secured.

It was noted above that in certain circumstances a separate harmonic generator, 9, to provide a heterodyning signal for the second mixer, 8, may not be required in the type of demodulator system illustrated in Figures 1, 2 and 3. In these embodiments the transmitter oscillator, when frequency modulated about a properly selected center frequency, delivers as part of its output a very small amplitude modulated third harmonic sideband signal. In the first mixer, 6, this is recovered as a 30 megacycle signal which is then passed on to the second mixer. Now, if the 30 megacycle bandpass amplifier has sufficient gain, this 30 megacycle component will be delivered with appreciable amplitude and can thus serve as the necessary heterodyning signal at the second mixer. It is to be realized, however, that if automatic gain control is applied to the system, the amplitude of this 30 megacycle component will vary inversely with the amplitude of received echoes. Therefore, systems with automatic gain control must provide other means such as the separate harmonic generator, 9, to apply the required heterodyning signal to the second mixer.

Whereas the invention has been described, for the purpose of illustrating its principles, in connection with only a few types of continuous wave Doppler radar systems, it will be understood by those skilled in the art that said invention may be applied to Doppler radar systems of other types and at any desired operating frequency to very great advantage. The scope of the invention, therefore, is not to be considered solely in the light of the embodiments herewith described for the purpose of setting forth the operation thereof, but is to be construed as comprising the subject matter set forth in the appended claims.

The embodiments of the invention in which an exclusive property or privilege is claimed are defined as follows:

1. A continuous wave Doppler radar system comprising, in combination, a transmitter of the frequency modulated type operating at a given carrier frequency; means to frequency modulate said transmitter; means to emit transmitter energy from said system; a transmitter signal channel connecting said transmitter to said energy emitting means; means to receive target echo signals; a first mixer; a target echo signal channel connecting said first mixer to said target echo receiving means; means to apply to said first mixer without frequency translation signals from said transmitter, said applied signals from said transmitter having a static envelope noise contour the amplitude of which diminishes as a function of the frequency displacement from said carrier frequency to the same order of magnitude as the smallest target echo signal to be examined at a given frequency displacement from said carrier frequency; frequency selective signal wave translation means fed from said first mixer and responsive to a predetermined band of signals, said band of signals having a width at least as great as the frequency range of the Doppler frequency shift of signals to be received, and a lowest frequency at least as great as the value of said given frequency displacement; Doppler frequency signal demodulator means fed from said signal wave translation means; and utilization means responsive to the output of said demodulator means, said means to frequency modulate said transmitter modulating said transmitter at a given modulation frequency and with a given frequency deviation, said given modulation frequency being such that a predetermined integral harmonic of said given modulation frequency falls within the acceptance band of said frequency selective signal wave translation means and said given modulation frequency being greater than twice the maximum Doppler frequency shift to be measured, and said given frequency deviation being such as to result in an index of modulation of the same order of magnitude as is the number of said given harmonic.

2. A continuous wave Doppler radar system as claimed in claim 1 wherein the number of said predetermined integral harmonic is comprised between the limits of 1 and 5, and wherein said modulation index is less than the number of said harmonic.

3. A continuous wave Doppler radar system comprising, in combination, a transmitter of the frequency modulated type operating at a given carrier frequency; means to frequency modulate said transmitter; means to emit transmitter energy from said system; a transmitter signal channel connecting said transmitter to said energy emitting means; means to receive target echo signals; a first mixer; a target echo signal channel connecting said first mixer to said target echo receiving means; means to apply to said first mixer without frequency translation signals from said transmitter, said applied signals from said transmitter having a static envelope noise contour the amplitude of which diminishes as a function of the frequency displacement from said carrier frequency to the same order of magnitude as the smallest target echo signal to be examined at a given frequency displacement from said carrier frequency; frequency selective signal wave translation means fed from said first mixer and responsive to a predetermined band of signals, said band of signals having a width at least as great as the frequency range of the Doppler frequency shift of signals to be received, and a lowest frequency at least as great as the value of said given frequency displacement; Doppler frequency signal demodulator means fed from said signal wave translation means; and utilization means responsive to the output of said demodulator means, said means to frequency modulate said transmitter modulating said transmitter at a given modulation frequency and with a given frequency deviation, said given modulation frequency being such that a predetermined integral harmonic of said given modulation frequency falls within the acceptance band of said frequency selective signal wave translation means and said given modulation frequency being greater than twice the maximum Doppler frequency shift to be measured, and said given frequency deviation being such as to result in an index of modulation having approximately the value one half the sum of one plus the number of said given harmonic.

4. A continuous wave Doppler radar system including means to emit signal energy therefrom and means to receive target echo signals and comprising a tunable transmitter operating at a given carrier frequency feeding said means to emit signal energy and having noise components in the output thereof extending to a frequency removed from said carrier frequency by a given number of cycles; a first mixer fed from said means to receive with target echo signals and from said transmitter with a portion of the transmitter signals; means to frequency modulate said transmitter at a given rate said rate being such as to simultaneously satisfy the relations that said given rate is greater than said given number of cycles and that the reciprocal of said given rate is substantially less than the travel time of signals from said radar system to the nearest desired target, and with a frequency deviation such as to result in a modulation index of the same order of magnitude as is the number 3; frequency selective signal wave translation means fed from said first mixer and responsive to a band of signals located at a frequency which is a given harmonic of said given rate the number of said given harmonic being not substantially greater than twice said modulation index; Doppler frequency signal demodulator means fed from said signal wave translation means; and utilization means responsive to the output of said demodulator means.

5. A continuous wave Doppler radar system as claimed in claim 1 wherein said means to emit transmitter energy and said means to receive target echo signals are comprised by a single antenna system, and wherein said signal channel connecting said transmitter and said signal channel connecting said mixer are connected in common to said single antenna by a duplexing means separating said transmitter energy and said target echo signals.

6. A continuous wave Doppler radar system as claimed in claim 5 wherein said duplexing means is a hybrid junction.

7. A continuous wave Doppler radar system as claimed in claim 5 wherein said duplexing means is a circulator using the Faraday rotation effect.

8. A continuous wave Doppler radar system as claimed in claim 5 wherein said duplexing means is a circulator using the Faraday rotation effect and wherein said connection in common between said circulator and the antenna is a channel in which is placed a partial reflector adapted to reflect back to said circulator a predetermined portion of the transmitter energy incident upon said partial reflector.

9. A continuous wave Doppler radar system as claimed in claim 1 wherein said means to emit transmitter energy and said means to receive target echo signals comprise separate and decoupled antennas, and wherein said means to apply signals from said transmitter to said first mixer comprises a separate channel connecting said transmitter signals to said mixer.

10. A continuous wave Doppler radar system as claimed in claim 1 wherein said Doppler frequency signal demodulator means is an envelope detector.

11. A continuous wave Doppler radar system as claimed in claim 1 wherein said Doppler frequency signal demodulator means comprises a second mixer fed with signals from said signal wave translating means and from means responsive to said means to frequency modulate said transmitter adapted to develop signals of the frequency of said predetermined harmonic of said given modulation frequency.

12. A continuous wave Doppler radar system as claimed in claim 11 wherein said means to develop signals of the frequency of said predetermined harmonic of said given modulation frequency is a harmonic generator fed from said means to frequency modulate said transmitter.

13. A continuous wave Doppler radar system as claimed in claim 11 wherein said means to develop signals of the frequency of said predetermined harmonic of said given modulation frequency comprises, in combination, said transmitter oscillator, said transmitter oscillator being of the type adapted to produce also in response to the action of said means to frequency modulate said transmitter amplitude modulation products inclusive of said predetermined harmonic whereby at the said first mixer is recovered a signal of said predetermined harmonic of said given modulation frequency which is passed through said signal wave translating means to said second mixer.

14. A continuous wave Doppler radar system as claimed in claim 1 wherein said Doppler frequency signal demodulator means comprises a discriminator adapted to develop an output representative of the difference in frequency between the signal fed thereto and said predetermined harmonic of said given modulation frequency.

15. A continuous wave Doppler radar system as claimed in claim 14 wherein the output of said discriminator is used in a feedback loop to control the frequency of said means to frequency modulate said transmitter, and wherein said utilization means is arranged to provide a measure of the frequency of operation of said means to frequency modulate said transmitter.

16. A microwave continuous wave Doppler radar system of the type comprising a transmitter section and a receiver section and wherein target echo signals are heterodyned in the receiver section in a first mixer with signals derived without frequency translation from the transmitter characterised in that said system comprises, in combination, a single antenna system for both transmission and reception; duplexing means of the circulator type connecting said antenna to the transmitter and receiver sections of said radar; partial reflector means in the channel between said circulator and said antenna and adapted to reflect to said circulator a predetermined portion of the transmitter energy incident thereupon; a transmitter oscillator of the electrically tunable type operating at a given carrier frequency and comprising at least one cavity resonator; a first mixer fed from said circulator with target echo signals and transmitter signals, said transmitter signals having a static electronic noise envelope contour the amplitude of which diminishes as a function of displacement from the carrier frequency to the order of magnitude of the smallest target echo signal to be examined at a given number of cycles removed from the carrier frequency of said oscillator; a band pass amplifier fed from said first mixer and responsive to signals in a band of frequencies beyond said given number of cycles; a source of frequency modulation signals of a frequency, a predetermined harmonic of which between the limits of 1 and 5 falls within the passband of said bandpass amplifier; means to apply said frequency modulation signals to said oscillator so as to produce a frequency deviation such as to result in a modulation index of approximately the value one half the sum of one plus said predetermined harmonic number; a harmonic generator coupled to said source of frequency modulation signals and adapted to produce an output signal of frequency equal to said predetermined harmonic; a second mixer fed from said bandpass amplifier and from said harmonic generator; a low pass filter fed from said second mixer; and utilization means responsive to the output of said low pass filter.

References Cited in the file of this patent

UNITED STATES PATENTS

| | | |
|---|---|---|
| 2,523,537 | Mayer | Sept. 26, 1950 |
| 2,535,274 | Dicke | Dec. 26, 1950 |
| 2,611,125 | Dicke | Sept. 16, 1952 |